US011379225B1

United States Patent
Velusamy et al.

(10) Patent No.: US 11,379,225 B1
(45) Date of Patent: Jul. 5, 2022

(54) SYSTEM AND METHODS FOR APPLICATION PROGRAMMING INTERFACE REFERENCE DOCUMENTATION UPDATER

(71) Applicant: Wells Fargo Bank, N.A., San Francisco, CA (US)

(72) Inventors: Saravanakumar Velusamy, San Francisco, CA (US); Srilakshmi Mudigere, San Francisco, CA (US); Ramesh N. Tejavath, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/196,688

(22) Filed: Mar. 9, 2021

(51) Int. Cl.
  G06F 9/44 (2018.01)
  G06F 8/73 (2018.01)
  G06F 9/4401 (2018.01)
  G06F 9/54 (2006.01)

(52) U.S. Cl.
  CPC .............. *G06F 8/73* (2013.01); *G06F 9/4411* (2013.01); *G06F 9/547* (2013.01)

(58) Field of Classification Search
  None
  See application file for complete search history.

(56) References Cited

U.S. PATENT DOCUMENTS

| | | | |
|---|---|---|---|
| 2014/0289702 A1* | 9/2014 | McMahon | G06F 8/30 715/239 |
| 2017/0102925 A1* | 4/2017 | Ali | G06F 8/30 |
| 2020/0192661 A1* | 6/2020 | Doyle | G06F 8/73 |
| 2020/0218588 A1* | 7/2020 | Sarid | G06F 9/451 |
| 2020/0285528 A1* | 9/2020 | Olsen | G06F 40/205 |
| 2020/0364044 A1* | 11/2020 | Bahrami | G06F 8/73 |
| 2021/0216288 A1* | 7/2021 | Bahrami | G06F 8/315 |
| 2021/0318866 A1* | 10/2021 | Pollock | G06F 8/73 |

* cited by examiner

Primary Examiner — Insun Kang
(74) Attorney, Agent, or Firm — Foley & Lardner LLP

(57) ABSTRACT

Systems, methods, and apparatuses for an application programming interface (API) definition automation system that is structured to programmatically generate API documentation in human-readable format. A control database is structured to retrievably store control documents. A content database is structured to retrievably store control document templates. A configuration file manager circuit is structured to generate an API configuration file in a data serialization language. An editor circuit structured to receive the API configuration file and a first control document that is human-readable. The editor circuit is also structured to generate a user interface that includes an API call executable structured to generate an API call field and a table editor executable structured to generate a parameter table. The editor circuit is also structured to apply a modification to the first control document. A content management system is structured to receive the first control document and generate an output document.

20 Claims, 8 Drawing Sheets

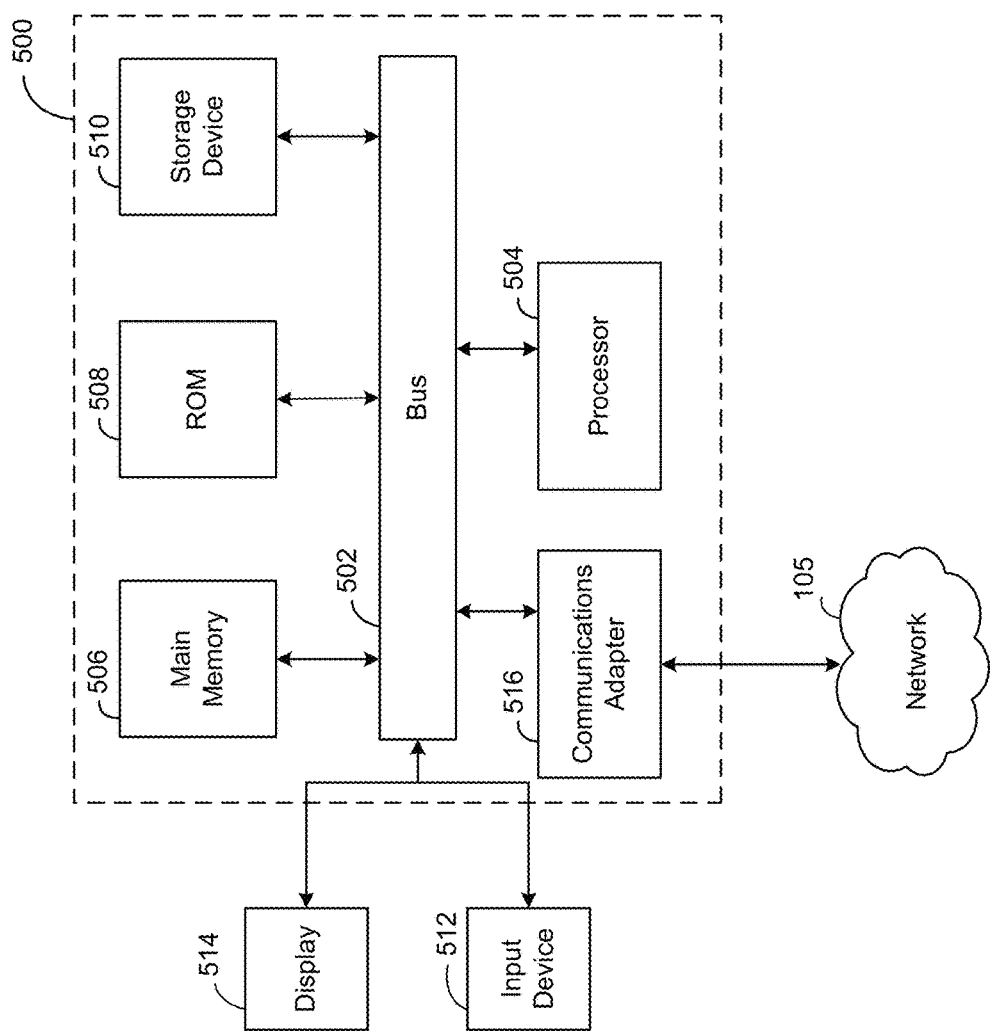

SYSTEM AND METHODS FOR APPLICATION PROGRAMMING INTERFACE REFERENCE DOCUMENTATION UPDATER

TECHNICAL FIELD

The present disclosure relates to systems and methods for Application Program Interface (API) Reference Documentation updater.

BACKGROUND

An application programming interface (API) is used to define interactions between multiple software intermediaries. An API defines various calls that can be made, how to make the calls, the types of data formats to be used, and other parameters. An API abstracts underlying code and only exposes objects or actions for developers to interact with the API. APIs can be accompanied by documentation, such as developer guides, user guides, and the like, that explains the purpose of an API and how to interact with the API. The documentation may include a collection of references, tutorials, examples, and so on that help developers use an API. Multiple users typically need to collaborate to create, edit, and publish API documentation. API development team may create a first draft of the API documentation in a first format. A content management team may edit or modify the first draft and create a second draft in a second format. An editorial team and/or a legal team may perform a compliance check on the second draft and create a third draft in a third format. A developer team may publish a final draft on various environments such as a webpage in HTML format.

SUMMARY

At least one arrangement relates to an application programming interface (API) definition automation system that is structured to programmatically generate API documentation in human-readable format. The system includes a network, a control database, a content database, a configuration file manager circuit, an editor circuit, and a content management system. The control database is structured to retrievably store control documents and communicatively coupled to the network. The content database is structured to retrievably store control document templates and communicatively coupled to the network. The configuration file manager circuit is communicatively coupled to the network and structured to generate a API configuration file in a data serialization language. The API configuration file is machine-readable. The editor circuit is communicatively coupled to the network. The editor circuit structured to receive the API configuration file. The editor circuit is also structured to receive a first control document. The first control document is human-readable and includes at least one of the control documents and the control document templates. The editor circuit is also structured to generate a user interface. The user interface includes an API call executable structured to generate, based on the API configuration file, an API call field and provide the API call field on the first control document. The user interface also includes a table editor executable structured to generate, based on the API configuration file, a parameter table and provide the parameter table on a parameter field of the API call field. The editor circuit is also structured to receive a user input via the user interface and apply a modification to the first control document based on the user input. The content management system is structured to receive the first control document from the editor circuit. The content management system is also structured to generate an output document based on at least one of the control document and the modification, the output document having an HTML format.

Another arrangement relates to a method of programmatically generating an application programming interface (API) document in human-readable format. The method includes generating, by a configuration file manager circuit, an API configuration file in a data serialization language. The API configuration file is machine-readable. The method also includes receiving, by an editing circuit, the API configuration file and a control document. The control document is human-readable. The method also includes generating, by the editing circuit, a graphical user interface (GUI). The GUI includes the control document. The method also includes generating, by an API call executable and based on the API configuration file, an API call field. The API call field includes a header box, a parameter box, and a response box. The method also includes positioning, by the editing circuit, the API call field on the control document. The method also includes generating, by a table editor executable and based on the API configuration file, a parameter table. The method also includes positioning, by the document editing circuit, the parameter table on the parameter box. The method also includes receiving, by the document editing circuit, a user input. The user input includes a first modification. The method also includes applying, by the document editing circuit, the first modification to the control document. The method also includes receiving, by a content management system, the first control document from the editor circuit. The method also includes generating, by the content management system, an output document based on at least one of the control document and the modification, the output document having an HTML, format.

Another arrangement relates to a non-transitory computer readable medium having computer-executable instructions embodied therein that, when executed by at least one processor of a computing system, cause the computing system to perform operations to programmatically generate API documentation in human-readable format. The operation include receiving an API configuration file. The API configuration file is in a data serialization language and a machine-readable format. The operations also include receiving a control document. The control document is human-readable. The operations further include generating a graphical user interface (GUI). The GUI includes the control document. The operations also include generating an API call field. The API call field has a header and an interactive field that, when selected, opens a parameter field and a response field. The operations also include modifying the control document with the API call field. The operations also include generating a parameter table. The operations also include modifying the parameter field with the parameter table. The operations also include receiving a user input. The operations also include modifying the control document based on the user input. The operations also include generating an output document having an HTML format.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 8 is a component diagram of an example computing system suitable for use in the various arrangements described herein.

DETAILED DESCRIPTION

Figure 1:
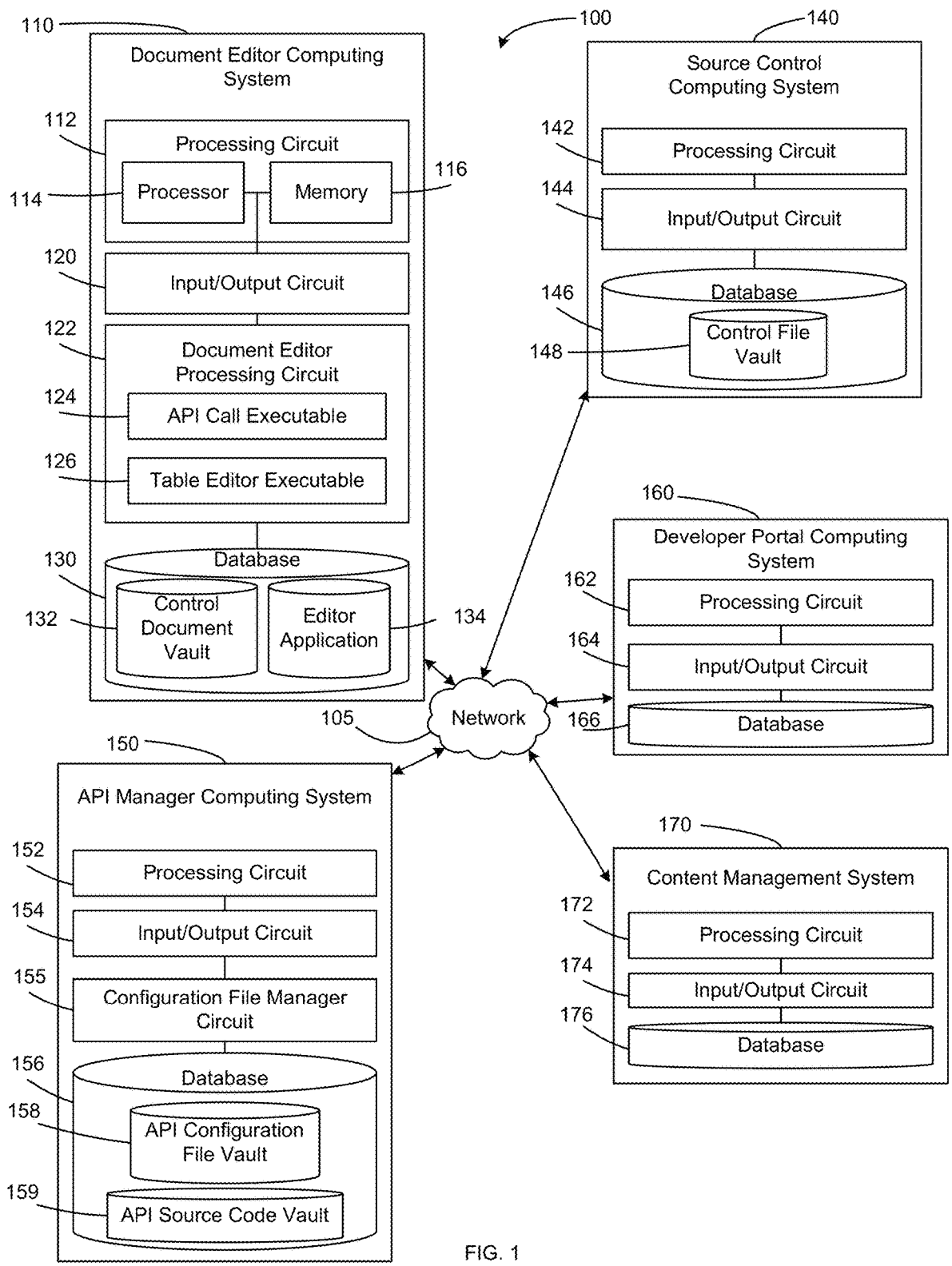
FIG. 1 is a component diagram of a computing system for generating application programming interface (API) documentation, according to an example arrangement.

Referring generally to the figures, systems and methods for programmatically generating application programming interface (API) documentation in various file formats are disclosed. As used herein and throughout the application, the term "format" refers to an encoding structure for computer data storage on a hardware-based medium. A file format can be characterized by one or more various properties, such as data type (video, image, text, combination), metadata type, file extension, data organization within the file (rows and columns, delimited, tag-based) and the like.

Conventionally, APIs are documented in data serialization languages, such as YAML and/or JSON. Various automated API documentation tools can be used. Data serialization languages are machine-readable languages that can be tag-based and focus on describing and classifying properties of various data objects and/or data streams. Data serialization languages can be useful in defining API message layout, but are limited in their support for advanced data types (e.g., may not allow embedding of images, multimedia, formatted data) and executable commands. Data serialization-based file formats allow developers to generate text-based resource listings for various APIs. However, a technical problem with API documentation written purely in a data serialization language is that data serialization-based file formats do not natively support integration with WYSIWYG ("what you see is what you get") API documentation editors. To solve this problem, the systems and methods described herein provide a technical improvement in the field of generating API reference documentation by automatically obtaining configuration files and control documents, generating a document editing graphical user interface (GUI) based on machine-readable files (e.g., YAML), automatically generating API call fields and parameter tables based on the configuration files and the control documents (e.g., YAML), and binding these items to a file designed to be human-readable and editable via a WYSIWYG user interface.

Further, the embodiments of the API documentation generation system as described herein improve API document generation technology by performing certain steps that cannot be done by conventional systems or human actors. For example, the API documentation generation system may reduce the number of transmissions necessary to publish an API reference document by automating at least part of the document generating process and providing a "what you see is what you get" (WYSIWYG) graphical user interface that is substantially similar for each user of the of the API document generation system. Specifically, automatically generating at least part of the document generating process requires fewer transmissions are necessary to generate a first draft of the API reference document. Additionally, providing the WYSIWYG graphical user interface allows each user of the API documentation generation system to visually confirm that the API reference document is being generated accurately.

In some arrangements, the API documentation generation system may retrievably store program files for an API, control documents and control document templates, machine-readable configuration files, and/or human-readable document files. In some arrangements, the API documentation generation system may communicatively interface with an API. The API may be in a non-standardized format or structure. The API documentation generation system is structured to generate, based on the non-standardized API, a standardized machine-readable configuration file in a data serialization language such as YAML or JSON. Additionally, the API documentation generation system may generate a graphical user interface (GUI) based on a control document and/or the configuration file. The API documentation generation system may provide the GUI to one or more remote computing devices via a network such that a user at each of the computing devices can access the GUI to read, modify, and/or publish the control document. Additionally, the API documentation generation system may be configured to automatically generate a notification responsive to and indicative of a user reading, modifying and/or publishing the control document. The notification may be automatically provided to each of the computing devices on the network in real time such that each user at each computing device has immediate access to the most recent revisions of the control document.

In an example arrangement, users may access various computing systems to prepare, create, edit, and publish an API reference document. The users may include one or more of an API team, a content management system (CMS) team, an editorial team, and a legal team. The API team may access an API manager computing system structured to maintain API support files such as pre-existing configuration files, code snippets files, release notes, public documentation, and the like. The API manager computing system may be structured to retrievably store the API support files in a source control computing system and/or source control database. The API team may also access a document editing computing system having an editor application. The document editing computing system may be structured to create a new reference document and automatically populate one or more text boxes or text fields on the reference document with human-readable data from the API support files. The document editing computing system may also be structured to generate an output file including the reference document in HTML format and/or other supporting files. The editorial team may further edit the output file using the document editing computing system to verify spelling and grammar. The legal team may verify the output file for legal compliance using the document editing computing system. The CMS team may utilize a CMS computing system to publish the document to one or more environments.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a component diagram of a computing system 100 for generating application programming interface (API) documentation, according to an example arrangement. In some arrangements the computing system 100 is associated with a service provider such as a business, a financial institution, and the like, which provides API(s) to other entities (e.g., to the partner entities of the business). In some arrangements, and as shown in FIG. 1, the computing system 100 includes a document editor computing system 110, a source control computing system 140, an application programming interface (API) manager computing system 150, a developer portal computing system 160, and a content management system (CMS) 170. Each of the computing systems may include any of transitory storage media, non-transitory storage media, hardware- and/or software-based circuitry, memory, and processor(s). Each of the computing systems of the computing system 100 is communicatively coupled to a network 105. Specifically, the document editor computing system 110, the source control computing system 140, the API manager computing system 150, a developer portal computing system 160, and the CMS 170 are communicatively coupled to the network 105 such that the network 105 permits the direct or indirect exchange of data, values, instructions, messages, and the like (represented by the double-headed arrows in FIG. 1). In some arrangements, the network 105 is configured to communicatively couple to additional computing system(s). For example, the network 105 may facilitate communication of data between the CMS 170 and other computing systems associated with the service provider or with a customer of the provider. The network 105 may include one or more of a cellular network, the Internet, Wi-Fi, Wi-Max, a proprietary provider network, a proprietary retail or service provider network, and/or any other kind of wireless or wired network.

The document editor computing system 110 includes a processing circuit 112, an input/output (I/O) circuit 120, one or more specialized processing circuits shown as a document editor processing circuit 122, and a database 130. The processing circuit 112 may be coupled to the input/output device 120, the specialized processing circuits, and/or the database 130. The processing circuit 112 may include a processor 114 and a memory 116. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicatively coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the computing system 110 is configured to run a variety of application programs and store associated data in a database of the memory 116 (e.g., database 130).

The input/output circuit 120 is structured to receive communications from and provide communications to other computing devices, users, and the like associated with the document editor computing system 110. The input/output circuit 120 is structured to exchange data, communications, instructions, and the like with an input/output component of the system 110 In some arrangements, the input/output device 120 includes communication circuitry for facilitating the exchange of data, values, messages, and the like between the input/output device 120 and the components of the system 110. In some arrangements, the input/output device 120 includes machine-readable media for facilitating the exchange of information between the input/output circuit 120 and the components of the system 110. In some arrangements, the input/output circuit 120 includes any combination of hardware components, communication circuitry, and machine-readable media.

In some arrangements, the I/O circuit 120 may include a network interface. The network interface may be used to establish connections with other computing devices by way of the network 105. The network interface may include program logic that facilitates connection of the system 110 to the network 105. In some arrangements, the network interface may include any combination of a wireless network transceiver (e.g., a cellular modem, a Bluetooth transceiver, a Wi-Fi transceiver) and/or a wired network transceiver (e.g., an Ethernet transceiver). For example, the I/O circuit 120 may include an Ethernet device such as an Ethernet card and machine-readable media such as an Ethernet driver configured to facilitate connections with the network 105. In some arrangements, the network interface includes the hardware and machine-readable media sufficient to support communication over multiple channels of data communication. Further, in some arrangements, the network interface includes cryptography capabilities to establish a secure or relatively secure communication session in which data communicated over the session is encrypted.

In some arrangements, the I/O circuit 120 includes suitable input/output ports and/or uses an interconnect bus (e.g., bus 502 in FIG. 8) for interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the input/output circuit 120 may provide an interface for the user to interact with various applications and/or executables (e.g., a document editing application, an API call executable 124, a table editor executable 126) stored on the system 110. For example, the input/output circuit 120 may include a keyboard, a keypad, a mouse, joystick, a touch screen, a microphone, a biometric device, a virtual reality headset, smart glasses, and the like. As another example, input/output circuit 120, may include, but is not limited to, a television monitor, a computer monitor, a printer, a facsimile, a speaker, and so on.

The memory 116 may store a database 130, according to some arrangements. The database may retrievably store control document templates and/or control documents in a control document vault 132. The control document templates are human-readable document files and are editable by the document editor processing circuit 122 and/or by user input via the I/O circuit 120. The database 130 may be configured to store one or more applications such as an editor application 134. In some arrangements, the editor application 134 may be incorporated with an existing application in use by the document editor computing system 110. In some arrangements, the editor application 134 is a separate software application implemented on the document editor computing system 110. The editor application 134 may be downloaded by the document editor computing system 110 prior to its usage, hard coded into the memory 116 of the processing circuit 112, or be a network-based or web-based interface application such that the document editor computing system 110 may provide a web browser to access the application, which may be executed remotely from the document editor computing system 110. Accordingly, the document editor computing system 110 may include software and/or hardware capable of implementing a network-based or web-based application. For example, in some instances, the editor application 134 includes software such as HTML, XML, WML, SGML, PHP (Hypertext Preprocessor), CGI, and like languages.

In the latter instance, a user (e.g., a provider employee) may log onto or access the web-based interface before usage of the application. In this regard, the editor application 134 may be supported by a separate computing system including one or more servers, processors, network interface, and so on, that transmit applications for use to the document editor computing system 110.

The document editor processing circuit 122 is structured facilitate generating and/or modifying control documents. In some arrangements, the document editor processing circuit 122 is also structured to generate and/or modify control document templates. The document editor processing circuit 122 includes an API call executable 124 and a table editor executable 126. In an example arrangement, the document editor processing circuit 122 is structured to receive an API configuration file (e.g., JSON, YAML, and other API settings files that are machine-readable) and a control document (e.g., a text document, a rich-text document, and other human-readable documents). The control document may be one or more of a control document template or a control document received from the control document vault 132, a pre-existing control document from the CMS 170, and/or a new control document generated by the document editor processing circuit 122. The document editor processing circuit 122 may generate a graphical user interface (GUI) that includes the control document. The GUI may be structured to display icons that are structured to execute the API call executable 124, the table editor executable 126, and/or other document editing executables. The document editor processing circuit 122 may also be structured to receive a user input via the GUI. The user input may include a modification the user wants to apply to the control document. The document editor processing circuit 122 may apply the modification to the control document. The document editor processing circuit 122 may also be structured to selectively provide the control document including the modification to other computing systems on the network 105 such as the CMS 170.

The API call executable 124 may be structured to generate an API call field based on the API configuration file. The API call executable 124 may provide the API call field to the GUI such that the API call field is positioned on the control document. The API call field may include one or more text boxes such as a header box, a parameter box, and a response box.

In some arrangements, the API call executable 124 may be structured to parse one or more alphanumeric values from the API configuration files and populate the one or more textboxes with the alphanumeric values before providing the API call field on the control document. For example, the API call executable 124 may parse a title from the API configuration files and pre-populate the header box with the title.

In some arrangements, the API call executable 124 may be structured to receive a user input (e.g., via the I/O circuit 120) including alphanumeric values to populate the one or more textboxes with the alphanumeric values. In some arrangements, the user input including the alphanumeric values are received and populate one or more textboxes before providing the API call field on the control document. In some arrangements, the user input is received and the alphanumeric values are provided on the textboxes after providing the API call field on the control document.

The table editor executable 126 may be structured to generate a parameter table based on the API configuration file. The table editor executable 126 may provide the parameter table on the GUI such that the parameter table is positioned on the parameter table on the control document and/or on the parameter box. The parameter table may include one or more cells structured to contain alphanumeric values. The cells may each include one or more parameters of the API configuration file.

In some arrangements, the table editor executable 126 may be structured to parse one or more alphanumeric values from the API configuration files and populate the one or more cells with the alphanumeric values before providing the API call field on the control document. In an example arrangement, the table editor executable 126 may parse a variable parameter from the API configuration files and populate one or more cells with the variable. In another example arrangement, the resource section from an API configuration file, such as a YAML file, can be used to populate one or more cells of the parameter table.

In some arrangements, the table editor executable 126 may be structured to receive a user input (e.g., via the I/O circuit 120) including alphanumeric values to populate the one or more cells of the parameter table with the alphanumeric values. In some arrangements, the user input including the alphanumeric values are received and populate one or more cells before providing the parameter table on the control document. In some arrangements, the user input is received and the alphanumeric values populate the cells after providing the parameter table on the control document.

The source control computing system 140 includes a processing circuit 142, an input/output (I/O) circuit 144, and a database 145. The processing circuit 142, the input/output circuit 144, and the database 146 may be the same or substantially similar to the processing circuit 112, the I/O circuit 120, and the database 130 of the document editor computing system 110. For example, the processing circuit 142 may include a processor and memory that is similar to or substantially the same as the processor 114 and memory 116.

In some arrangements, the database 146 is structured to retrievably store existing control files in a control file vault 148. The control files may include one or more of pre-existing control documents in a standardized or non-standardized format, code snippets files, release notes, public documentation, API source codes, and/or other files related to APIs associated with the computing system 100.

In some arrangements, the source control computing system 140 is structured to provide the control files to other computing systems on the network 105. For example, the source control computing system 140 may provide the control files to the document editing computing system 110. In some arrangements, the source control computing system 140 is structured to receive control files from other computing systems on the network 105. For example, the source control computing system 140 may receive control files from the API manager computing system 150.

The API manager computing system 150 includes a processing circuit 152, an input/output (I/O) circuit 154, a specialized processing circuit shown as configuration file manager circuit 155, and a database 156. The processing circuit 152, the input/output circuit 154, and the database 156 may be the same or substantially similar to the processing circuit 112, the I/O circuit 120, and the database 130 of the document editor computing system 110. For example, the processing circuit 152 may include a processor and memory that is similar to or substantially the same as the processor 114 and memory 116.

In some arrangements, the database 156 is structured to retrievably store API configuration files in an API configuration file vault 158. The API configuration files may include one or more of JSON, YAML, and other API settings files. In some arrangements, the API configuration files are machine-readable. In some arrangements, the API configuration files are human-readable. In some arrangements, the database 156 is also structured to retrievably store API source code files in an API source code vault 159.

The configuration file manager circuit 155 is structured to generate API configuration files in a data serialization language such as YAML, JSON, and the like. The API configuration may be machine-readable and/or human readable. In some arrangements, the API configuration files are based on an API. The API may be in a standardized format or a non-standardized format. In some arrangements, the configuration file manager circuit 155 is structured to receive a user input (e.g., via I/O circuit 154) to generate the configuration files. In some arrangements, the configuration file manager circuit 155 is structured to automatically generate the configuration files based on the API. For example, the configuration file manager circuit 155 may be structured to parse configuration variables, resource listings, and other API parameters from the API source code.

In some arrangements, the API manager computing system 150 is structured to provide the control files to other computing systems on the network 105 such as the document editor computing system, the source control computing system 140.

In some arrangements, the API manager computing system 150 is structured to generate, maintain, and/or publish APIs. For example, a user of the API manager computing system 150 may create new APIs, modify and/or maintain existing APIs, publish new APIs, and/or publish updates to existing APIs.

The developer portal computing system 160 provides a computing environment for API developers and may include various computer applications, executable files, websites, web page definition files, repositories (e.g., a documentation database, a source code database, a version control database), etc. As shown, the developer portal computing system 160 includes a processing circuit 162, an input/output (I/O) circuit 164, and a database 165. The processing circuit 162, the input/output circuit 164, and the database 166 may be the same or substantially similar to the processing circuit 112, the I/O circuit 120, and the database 130 of the document editor computing system 110. For example, the processing circuit 162 may include a processor and memory that is the same or substantially similar to the processor 114 and memory 116.

In some arrangements, the developer portal computing system 160 is structured to provide publish control documents to one or more environments such as a webpage. In some arrangements, the developer portal computing system 160 is structured to allow a user to verify the content of an API, an API configuration file, and/or a control document. In some arrangements, the developer portal computing system 160 is structured to provide one or more API configuration files to other computing systems on the network 105.

The content management system 170 includes a processing circuit 172, an input/output (I/O) circuit 174, and a database 175. The processing circuit 172, the input/output circuit 174, and the database 176 may be the same or substantially similar to the processing circuit 112, the I/O circuit 120, and the database 130 of the document editor computing system 110. For example, the processing circuit 172 may include a processor and memory that is the same or substantially similar to the processor 114 and memory 116.

In some arrangements, the content management system 170 is structured to receive a control document from other computing systems on the network 105 such as the document editor computing system 110. In some arrangements, the CMS 170 is structured to generate an output document based on one or more of a control document and a modification to the control document. In some arrangements, the output document has an HTML format. In some arrangements, the CMS 170 is structured to provide the output document to other computing systems on the network 105 such as the developer portal computing system 160.

Figure 2:
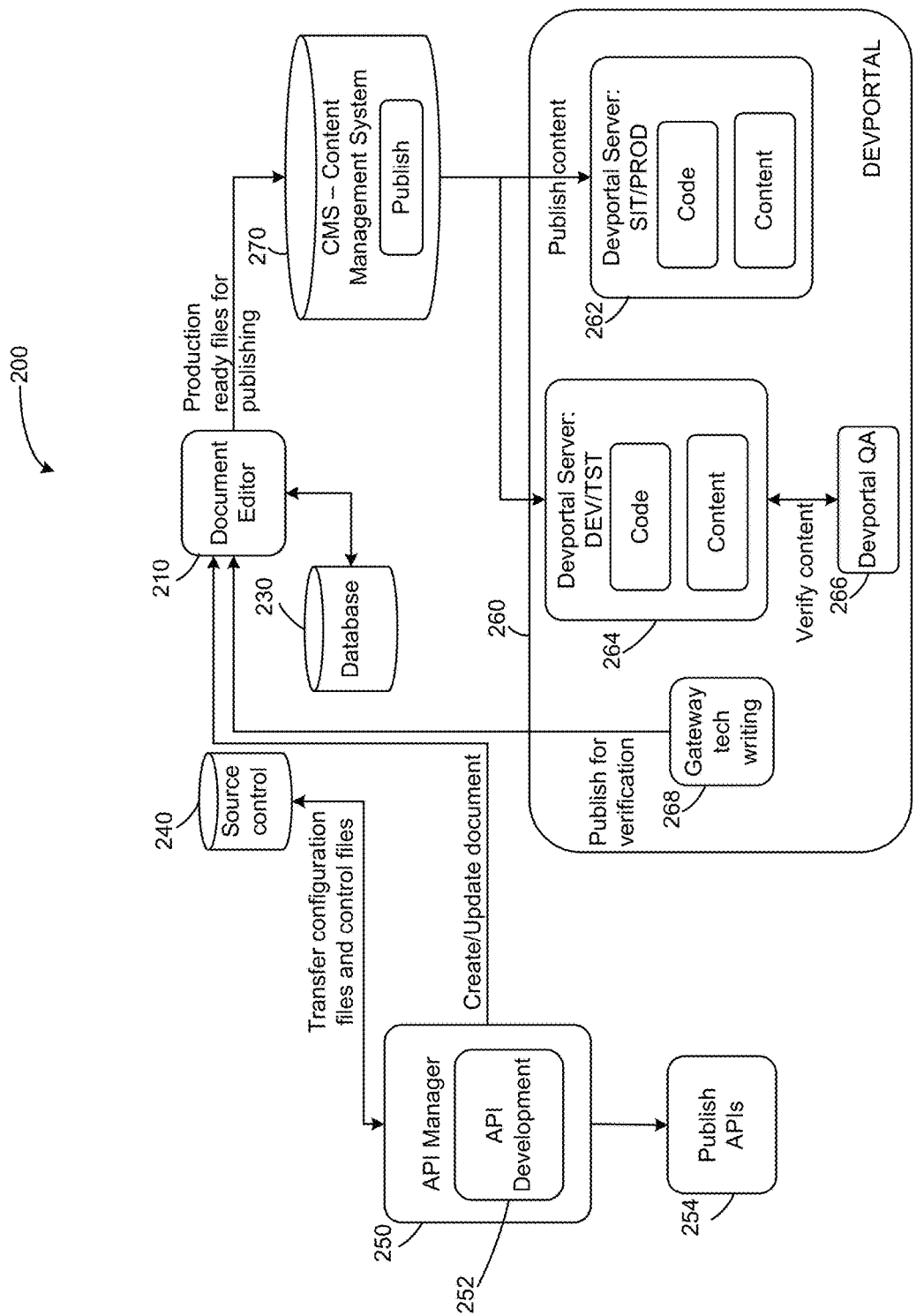
FIG. 2 is a block diagram showing various aspects of the computing system of FIG. 1, according to an example arrangement.

FIG. 2 is a block diagram 200 showing various aspects of the computing system 100 of FIG. 1, according to an example arrangement. The block diagram 200 shows a workflow for the computing system 100, according to an example arrangement. Each of the nodes of the block diagram 200 may occur concurrently, partially concurrently, or sequentially. Additionally, each of the computing systems of the block diagram 200 may be communicably coupled to the network 105 of FIG. 1.

In some arrangements and as shown in FIG. 2, the block diagram 200 includes nodes shown as a document editor 210, a content database 230, a source control 240, an API manager 250, a developer portal 260, and a CMS 270. Each node of the block diagram 200 may represent a computer actor such as a computing system, database, processing circuit, and the like and/or a human actor such as a user. According to various example arrangements, the document editor 210, the content database 230, the source control 240, the API manager 250, a developer portal 260, and the CMS 270 are substantially similar to or the same as the document editor computing system 110, the database 130, the source control computing system 140, the API manager computing system 150, the developer portal computing system 160, and the CMS 170, respectively.

The API manager 250 is structured to manage APIs and API configuration files. According to an example arrangement, the API manager 250 is substantially similar to or the same as the API manager computing system 150. In some arrangements, the API manager 250 may be structured to generate new APIs and/or modify or update existing APIs, and/or prepare APIs for publishing. For example, in some arrangements and as shown in FIG. 2, the API manager 250 includes an API development node 252. The API development 252 is structured to generate new APIs, modify existing APIs, and/or prepare APIs for publishing at publish APIs node 254. In some arrangements, the API development node 252 may include one or more users of the computing system 100 such as employees of a service provider (e.g., members of an API development team). In some arrangements, the API manager node 250 and/or the API development node 252 is/are structured to send API source code to be published at Publish APIs node 254.

In some arrangements, the API manager 250 may also be structured to generate API configuration files. In some arrangements, the API manager 250 is structured to receive a user input to generate API configuration files in a machine-readable data serialization language such as YAML, JSON, and the like. In some arrangements, the API manager 250 is structured to parse API configuration data from an API source code and output a configuration file in a machine-readable data serialization language such as YAML, JSON, and the like.

Publish APIs node 254 may be structured to publish and/or support APIs. For example, the Publish APIs node 254 may include computing systems or servers and/or networking hardware and software to access remote or third party computing systems or servers through which published APIs can be accessed (e.g., via the network 105) by users (e.g., provider employees, customers of the provider).

In some arrangements, the API manager node 250 and/or the API development node 252 may be structured to generate API control files. The control files may include one or more of pre-existing control documents in a standardized or non-standardized format, code snippets files, release notes, public documentation, API source codes, and/or other files related to APIs associated with the computing system 100. In some arrangements the API manager node 250 is structured to communicatively couple to a source control node 240 such that control files and/or configuration files may be transferred between the API manager node 250 and the source control node 240. The API manager node 250 may be structured to retrievably store the control files and/or the configuration files at the source control node 240.

In some arrangements, the source control node 240 is substantially similar to or the same as the source control computing system 140. The source control node 240 may be structured to communicably couple to the API manager node 250. The source control node 240 may also be structured to retrievably store the control files and/or the configuration files.

The API manager node 250 may also be structured to communicably couple to the document editor node 210. The API manager node 250 may be structured to access the document editor node 210 such that a user associated with the API manager node 250 and/or the API development node 252 may create new control documents at the document editor node 210. The API manager node 250 may be structured to access the document editor node 210 such that the user may also upload control files and/or configuration files to the document editor node 210. In some arrangements, the API manager node 250 may allow one or more users to access the document editing application at the document editor node 210 to modify the control documents.

The document editor node 210 is structured to create and modify control documents. In some arrangements, document editor node 210 is substantially similar to or the same as the document editor computing system 110. In some arrangements, the document editor node 210 is structured to receive API configuration files and/or control files from the API manager node 250. In some arrangements, the document editor node 210 is structured to receive control documents from the source control node 240 directly or indirectly via the API manager node 250. In some arrangements, the document editor node 210 is also structured to receive one or more of a control document template and a control document from a content database 230.

The document editor node 210 is also structured to generate a user interface. The user interface may include a first control document. The user interface may also include an API call executable that is structured to generate an API call field based on API configuration files. The API call executable may also be structured to provide the API call field on the first control document. The user interface may also include a table editor executable structured to generate a parameter table based on the API configuration file. The Table editor executable is also structured to provide the parameter table on a parameter field of the API call field. The document editor node 210 may also be structured to receive a user input including a modification via the user interface. The document editor node 210 may also be structured to apply the modification to the first control document.

In some arrangements, document editor node 210 is structured to provide the first control document including the modification to the CMS node 270. In some arrangements, the document editor node 210 is structured to retrievably store the first control document including the modification at the database 230.

The database node 230 is structured to retrievably store one or more of control documents, control document templates, configuration files, and/or a document editing application. In some arrangements, the database node 230 is substantially similar to or the same as the database 130.

The CMS node 270 is structured to verify the content of control documents before the control documents are published. In some arrangements, the CMS 270 is substantially similar to or the same as the CSM 170. In some arrangements, the CMS 270 is structured to be accessed by one or more users to verify that the control document contains all necessary instructions to access an API at node 254. In some arrangements, the CMS 270 may be structured to allow one or more users to access the document editing application at the document editor node 210 to modify the control documents. In some arrangements, the CMS 270 may be structured to allow a user to attach one or more control files to the control document (e.g., via the user interface of the document editor 210) and/or generate an output file that includes one or more control files and one or more control documents. The CMS node 270 may be structured to provide the output file to the developer portal node 260.

The developer portal node 260 includes a developer portal server system integration test and production node shown as SIT/PROD node 262, a developer and testing node shown as DEV/TST node 264 a developer portal quality assurance node 266, and a gateway tech writing node 268. In some arrangements, the developer portal node 260 is substantially similar to or the same as the developer portal computing system 160. In some arrangements, one or more users (e.g., API developers, API testers, quality assurance team members, and other people associated with the service provider) may access the developer portal node 260 to modify one or more control documents. In some arrangements, the one or more control documents may be modified before they are published by the CMS 170. In some arrangements, the control documents may be modified, published and/or re-published by the developer portal node 260.

The developer portal server SIT/PROD node 262 is structured to provide users (e.g., customers of the service provider) access to published output files such as control documents, and control files. In some arrangements, the SIT/PROD node 262 is structured as a webserver structured to host a plurality of webpages. One or more of the webpages may include the control documents and/or the output documents published by the CMS 170 (e.g., in HTML format).

The developer portal DEV/TST node 264 is structured to facilitate testing of an API and/or testing of the control documents for use with an API. For example, DEV/TST node 264 may facilitate verification of the functionality of an API and/or the control documents.

The developer portal quality assurance node 266 is structured to facilitate reviewing, editing, and modifying control documents. For example, the quality assurance node 266 may be structured to facilitate verifying that the control documents are functional and operable by an end user (e.g., a customer).

The gateway tech writing node 268 is structured to facilitate modifying and/or creating control documents. In some arrangements, the gateway tech writing node 268 may be structured to facilitate generating technical descriptions of an API and/or an API call feature. For example, a user may provide additional technical writing to include on a control document via the gateway tech writing node 268.

Figure 3:
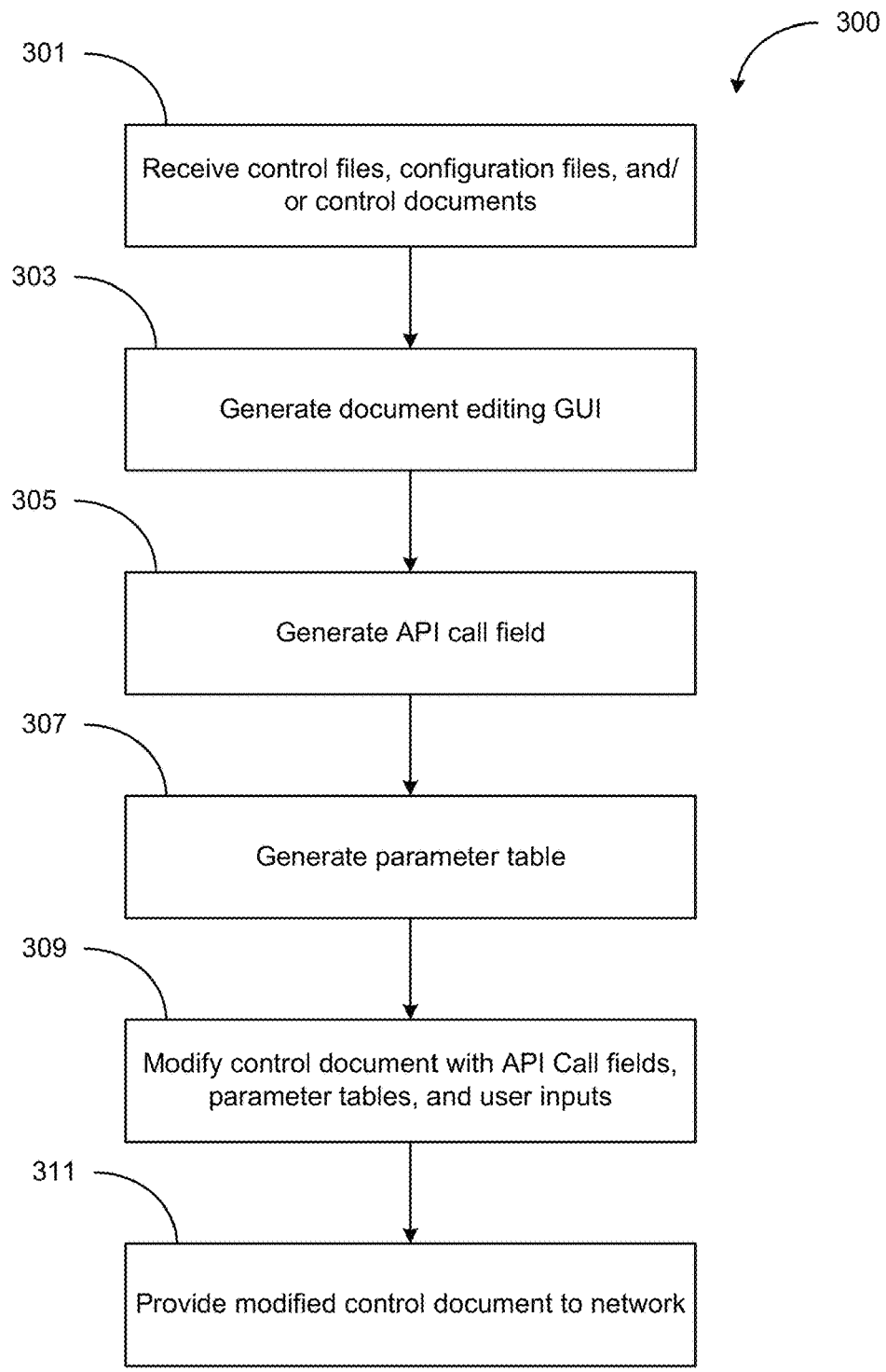
FIG. 3 is a flowchart of a method of generating API documentation files based on control documents, according to an example arrangement.

FIG. 3 is a flowchart of a method 300 of generating API documentation files based on control documents, according to an example arrangement. One or more of the computing systems of the computing system 100 may be configured to perform method 300. In an example arrangement, the document editor computing system 110 may, alone or in combination with other devices such as the API manager computing system 150, the CMS 170, and so on, may perform the method 300. In an example arrangement, the method 300 is performed by the document editor processing circuit 122 using the editor application 134. Further, the method 300 may include user inputs from a user (e.g., a provider employee) one or more user devices (such as devices of provider employees), another computing device on the network 105, and the like.

In broad overview of method 300, at step 301, the document editor computing system 110 receives control files, configuration files, and/or control documents. At step 303, the document editor computing system 110 generates a document editing graphical user interface (GUI). At step 305, the document editor computing system 110 generates API call fields. At step 307, the document editor computing system 110 generates parameter tables. At step 309, the document editor computing system 110 modifies the control document with API call fields, parameter tables, and user inputs. At step 311, the document editor computing system 110 provides the modified control document to the network 105.

Referring to the method 300 in more detail, at step 301, the document editor computing system 110 control files, configuration files, and/or control documents. In some arrangements, the control files and/or the configuration files may be received from the source control computing system 140 and/or the API manager computing system. In some arrangements, the control documents may include one or more control document templates. The templates may be structured to include text, figures, formatting, textboxes, tables, and other document parameters. In some arrangements, the control documents may include one or more pre-existing control documents. The pre-existing control documents may include a previous version of a control document, a control document of a related API, and the like.

At step 303, the document editor computing system 110 generates a document editing GUI. In some arrangements, the document editor computing system 110 may utilize the editor application 134 to generate the GUI. In some arrangements, the GUI may be structured to receive a user input (e.g., via the I/O circuit 120) that includes a modification to the control document. The user input may include one or more of an alphanumeric input (e.g., via a keyboard or a touchscreen) and a selection input (e.g., via a mouse or a touchscreen). In some arrangements, the editor application 134 may be structured to provide one or more interactive icons on the GUI. The interactive icons may be structured to receive a user input and cause the document editor processing circuit 122 to modify the control document. In some arrangements, the interactive icons may include the API call executable 124 and the table editor executable 126.

At step 305, the document editor computing system 110 generates an API call field. In some arrangements, the document editor computing system 110 is structured to generate the API call field responsive to receiving a user input. For example, the user input may include a user selecting the API call executable 124 on the GUI. In some arrangements, generating the API call field includes determining an API call title, an API method name, an API uniform resource locator (URL), and an API aria label. In some arrangements, the API call executable 124 is structured to generate the API call field based on one or more of the control files and the configuration files. In some arrangements, the API call executable 124 is also genera is structured to generate the API call field based on one or more user inputs.

At step 307, the document editor computing system 110 generates parameter table. In some arrangements, the document editor computing system 110 is structured to generate the parameter table responsive to receiving a user input. For example, the user input may include a user selecting the table editor executable 126 on the GUI. In some arrangements, generating the parameter table includes determining one or more table properties including table rows, table columns, table headers, table boarder size, table alignment, table caption, table summary, cell spacing, cell padding, cell widths, and cell heights. In some arrangements, the table editor executable 126 is structured to automatically convert some or all of the configuration files and/or the control files into the parameter table. In some arrangements, the table editor executable 126 is structured to generate the parameter table based on one or more user inputs.

At step 309, the document editor computing system 110 modifies the control document with API call fields, parameter tables, and user inputs. In some arrangements, the editor processing circuit is structured to modify the control document by providing the API call field, the parameter table, and/or other user inputs such as alphanumeric values, formatting selections, and the like.

In some arrangements, the document editor processing circuit 122 is structured to receive a user input (e.g., via the I/O circuit 120 and/or icons on the GUI). As described above, the user input may include one or more of an alphanumeric value and/or a selection of an icon. The document editor processing circuit 122 may be structured to modify the control document with the alphanumeric input and/or modify the formatting of text, figures, tables and the like, based on a selected icon. For example, a user may type an alphanumeric value into a keyboard, and the document editor processing circuit 122 may modify the control document to include the alphanumeric value. The user may select an icon to modify the formatting of text, figures, tables, and the like such as changing font type, size, and color, text alignment and spacing, and other document formatting parameters.

In some arrangements, the API call executable 124 is structured to automatically output an API call box that includes a header including the API call title, the API method name, the API URL, the aria label, and an interactive field that, when selected, opens the parameter field and a response field. In some arrangements, the API call field is programmatically linked to the control document by the API call executable 124.

In some arrangements, the table editor executable 126 is structured to automatically output the parameter table on the parameter field. The parameter table may include a parameter type and a parameter description. In some arrangements, the parameter table is programmatically linked to the parameter field of the API call field by the table editor executable 126.

At step 311, the document editor computing system 110 provides the modified control document to the network 105. For example, the document editor computing system 110 may provide the modified control document to the CMS 170 via the network 105.

Figure 4:
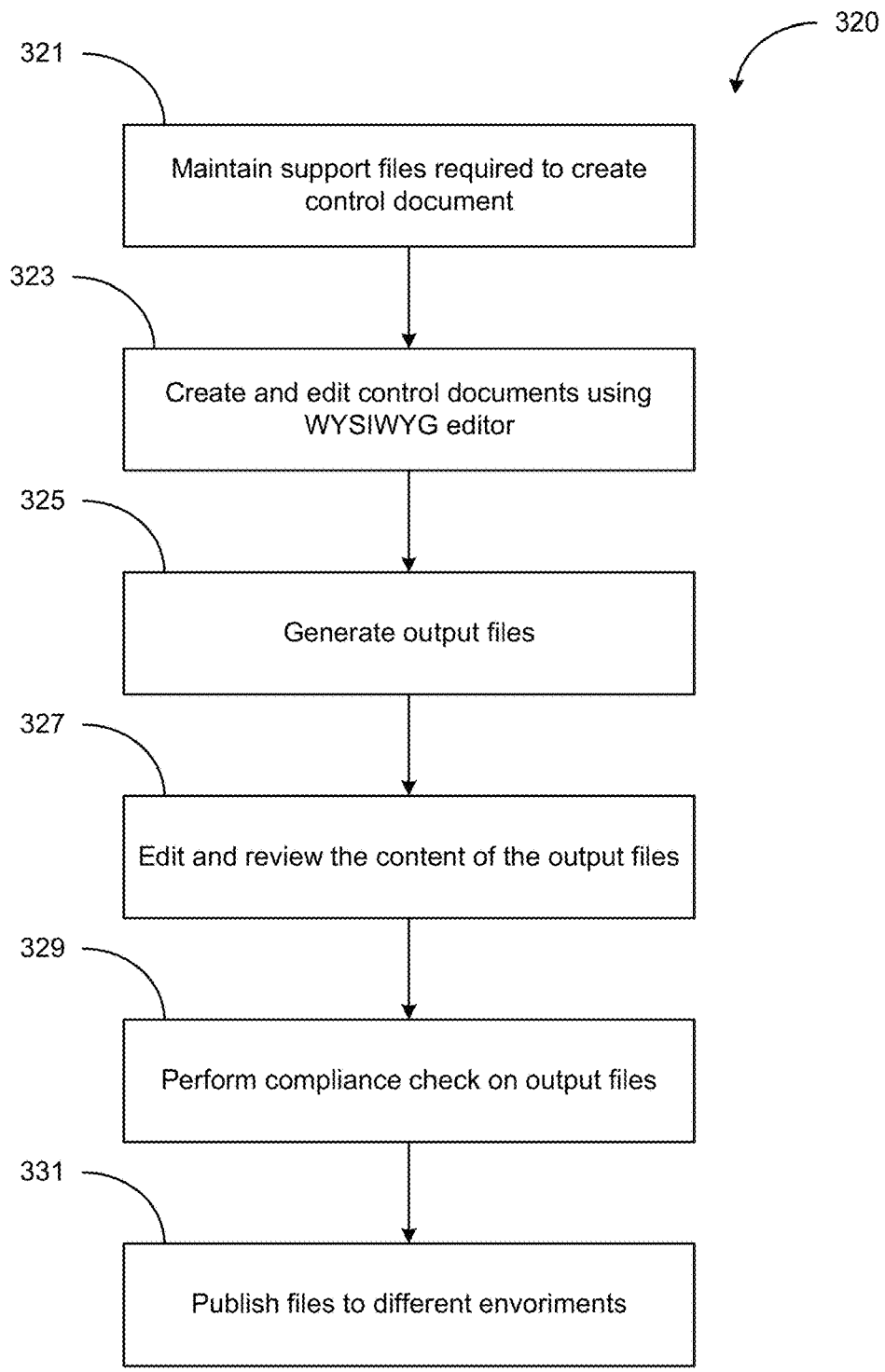
FIG. 4 is a flowchart of a method of generating and publishing API documentation files based on control documents, according to an example arrangement.

FIG. 4 is a flowchart of a method 320 of generating and publishing API documentation files based on control documents, according to an example arrangement. One or more of the computing systems of the computing system 100 may be configured to perform method 320. In an example arrangement, the document editor computing system 110 may, alone or in combination with other devices such as the API manager computing system 150, the CMS 170, and so on, may perform the method 320. Further, the method 320 may include user inputs from a user (e.g., a provider employee) one or more user devices (such as devices of provider employees), another computing device on the network 105, and the like. For example, one or more users may access one or more of the computing systems of the computing system 100 such as the document editor computing system 110, the API manager computing system 150, and so on, to perform the method 320.

In broad overview of method 320, at step 321, the API manager computing system 150 maintains support files required to create a control document. At step 323, the document editor computing system 110 creates and edits documents using a "What You See is What You Get" (WYSIWYG) editor. At step 325, the CMS 170 generates output files. At step 327, the CMS 170 and/or the developer portal computing system 160 reviews and edits the content of the output files. At step 329, the CMS 170 and/or the developer portal computing system 160 performs a compliance check on the output files. At step 331, the CMS 170 and/or the developer portal computing system 160 publishes the output files to one or more different environments.

At step 321, the API manager computing system 150 maintains support files required to create a control document. In some arrangements, API manager computing system 150 may facilitate one or more users, such as API development team members, generating modifying, and/or maintaining support files required to create a control document. The support files may include configuration files, control files, and other files related to an API. The one or more users may generate, modify, maintain, and/or access the support files via the API manager computing system 150.

At step 323, the document editor computing system 110 creates and edits documents using a "What You See is What You Get" (WYSIWYG) editor. The WYSIWYG editor may include one or more of the document editor computing system 110, the document editor processing circuit 122 and executables thereof, and/or the editor application 134. For example, and as described above with respect to FIGS. 1-3, the document editor computing system 110 is structured to generate and modify control documents. In some arrangements, one or more users (e.g., employees of the service provider) may access the WYSIWYG editor directly via the document editor computing system 110. In some arrangements, the one or more users may access the WYSIWYG editor indirectly by interfacing with the document editor computing system 110 from another computing system or computing device on the network 105 such as the API manager computing system 150, the CMS 170, and so on.

At step 325, the CMS 170 generates output files. At step 327, the CMS 170 and/or the developer portal computing system 160 reviews and edits the content of the output files. In some arrangements, the CMS 170 is structured to facilitate generating output files including a modified control document, configuration files, and/or control files by one or more uses (e.g., provider employees). In some arrangements, the CMS 170 is structured to facilitate generating the output files. For example, the CMS 170 may facilitate packaging some or all of the output files together (e.g., in a machine-readable file folder or a .zip file).

At step 329, the CMS 170 and/or the developer portal computing system 160 performs a compliance check on the output files. In some arrangements, CMS 170 and/or the developer portal computing system 160 are structured to facilitate one or more users accessing the control files. In some arrangements, the CMS 170 and/or the developer portal computing system 160 may be structured to facilitate editing the control files. In some arrangements, the CMS 170 and/or the developer portal computing system 160 may be structured to run a local version of the WYSIWYG editor (e.g., by running the editor application 134 locally) to modify a control document. In some arrangements, the CMS 170 and/or the developer portal computing system 160 are structured to facilitate access to the document editor computing system 110 (e.g., via the network 105) such that a user of the CMS 170 and/or the developer portal computing system 160 may access the WYSIWYG editor remotely.

At step 331, the CMS 170 and/or the developer portal computing system 160 publishes the output files to one or more different environments. For example, the CMS 170 and/or the developer portal computing system 160 may be structured to output the control document in an HTML format on a webpage.

Figure 5:
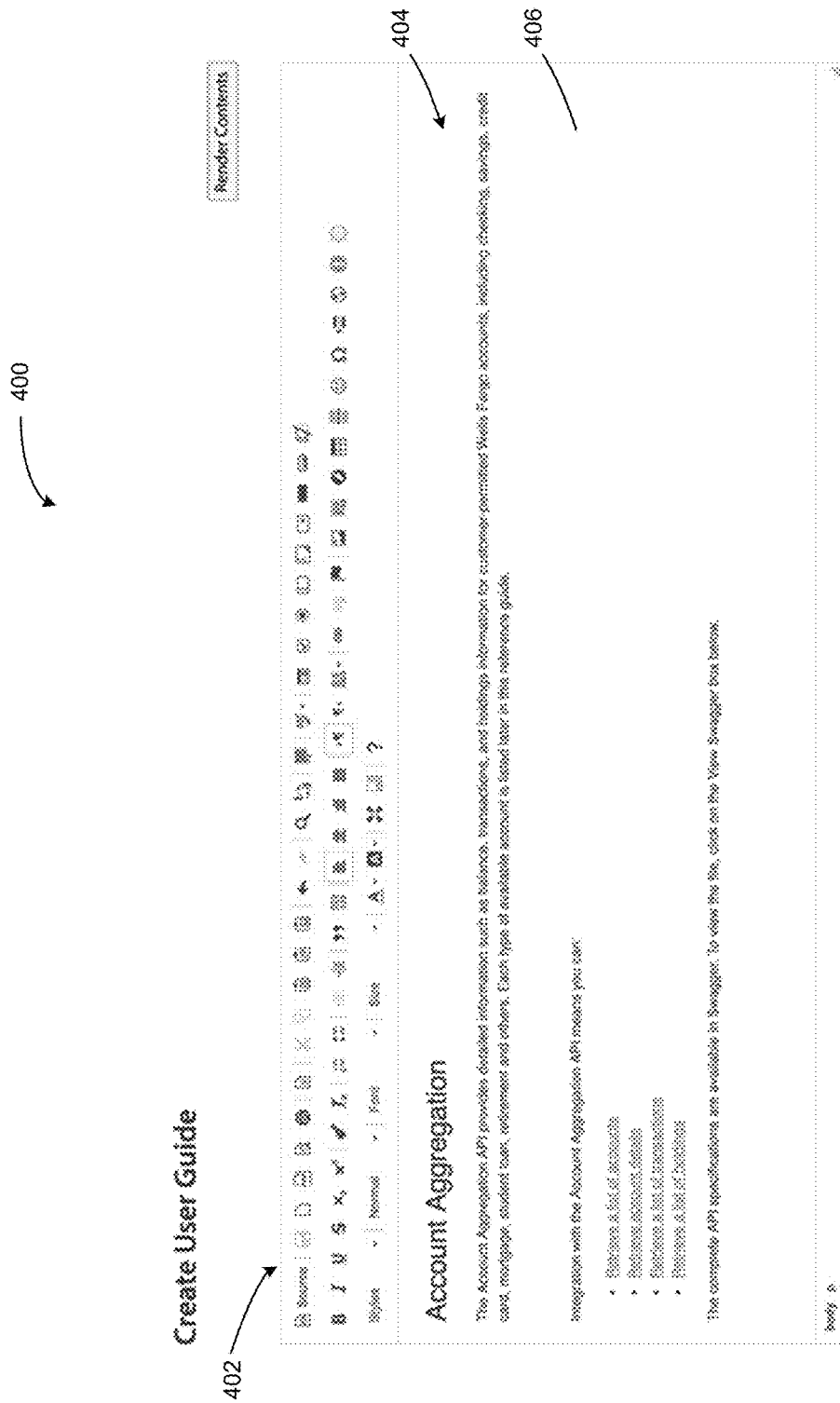
FIG. 5 is an illustration of some aspects of an API documentation editor user interface displaying an example API control document, according to an example arrangement.

FIG. 5 is an illustration of some aspects of an API documentation editor user interface 400 displaying an example API control document 404, according to an example arrangement. In some arrangements, the user interface 400 is generated by the document editor computing system 110 utilizing the editor application 134.

As shown the user interface 400 includes interactive icons shown as icons 402. One or more of the icons 402 may be structured to, when selected by a user, apply a modification to the formatting of the control document in the user interface shown as control document 404. In some arrangements, the icons 402 may be structured to access an executable such as the API call executable 124 and the table editor executable 126. In some arrangements, the icons 402 may be structured to facilitate other functions related to generating, modifying, and/or publishing the control document 404. For example, the icons 402 may be structured to facilitate accessing configuration files and control files, retrieving, retrievably storing, or publishing control documents, and/or accessing other programs or executables on the computing system 100.

In an example arrangement, the user interface 400 is structured to display the control document 404 substantially similar to a published version of the control document 404 such that a user viewing the user interface 400 can see the published version of the control document 404 before the computing system 100 publishes the control document 404. In some arrangements, the control document 404 is structured to have a rich text format. As shown, the control document 404 is structured to include a document field 406. The document field 406 is structured to include text, images, hyperlinks, tables, and other document entities.

Figures 6A, 6B:
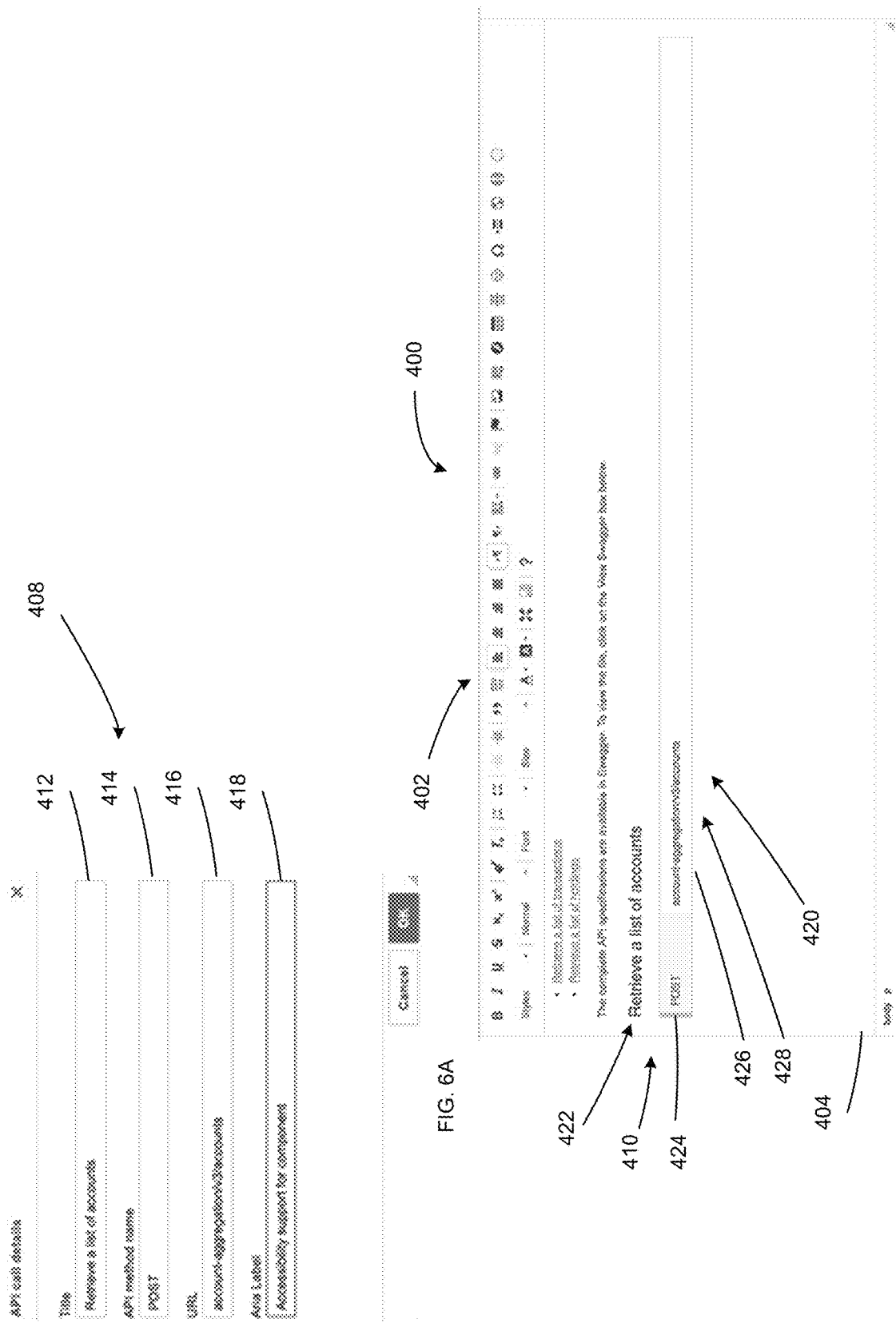
FIG. 6A is an illustration of some aspects of an API documentation editor user interface displaying an API call executable, according to an example arrangement.
FIG. 6B is an illustration of some aspects of an API documentation editor user interface displaying an example API call field, according to an example arrangement.

FIG. 6A is an illustration of some aspects of an API documentation editor user interface 400 displaying an API call executable interface 408, according to an example arrangement. The API call executable interface 408 is structured to facilitate user interaction with the API call executable 124. In some arrangements, when the API call executable 124 is selected by a user (e.g., via the user interface 400), the API call executable interface 408 may be displayed on the user interface 400 by the document editor computing system 110 utilizing the editor application 134. In some arrangements, and as shown in FIG. 6A, the API call executable interface includes 408 fields structured to receive a user input. The fields include a title field 412, a method field 414, a URL field 416, and an aria label field 418. In some arrangements, the fields are selectively automatically populated by the API call executable 124 based on one or more of the control files and the configuration files. In some arrangements, when one or more of the fields is not automatically populated, the API call executable interface 408 may include a prompt for a user to input alphanumeric values into each unpopulated field. The API call executable 124 is structured to generate, based on the alpha numeric values in the title field 412, the method field 414, the URL field 416, and the aria label field 418, an API call field.

FIG. 6B is an illustration of some aspects of an API documentation editor user interface 400 displaying an example API call field 410, according to an example arrangement. In some arrangements, the API call executable 124 is structured to output an API call field 410 on the control document 404. In some arrangements, the API call field 410 includes a header 422, an API method name field 424, an API URL field 426, an aria label field 428, and an interactive field 420. In some arrangements, each field of the API call field is a textbox, each textbox is structured to contain alphanumeric values including formatting such as font, color, and the like.

The API call executable 124 is structured to retrieve the alphanumeric values in the title field 412 and provide the alphanumeric vales at the header 422. The API call executable 124 is structured to retrieve the alphanumeric values in the method field 414 and provide the alphanumeric vales at the API method name field 424. The API call executable 124 is structured to retrieve the alphanumeric values in the URL field 416 and provide the alphanumeric vales at the API URL field 426. The API call executable 124 is structured to retrieve the alphanumeric values in the aria label field 418 and provide the alphanumeric vales at the aria label field 428.

In some arrangements, the aria label field 428 is structured to hide the alphanumeric values of the aria label field 428 until a user interacts with an area bounded by the aria label field 428. For example the aria label field 428 may be structured as a tool-tip such that when a user moves a curser over an area bounded by aria label field 428, the alphanumeric values of the aria label field 428 is displayed on the user interface 400.

Figure 7A:
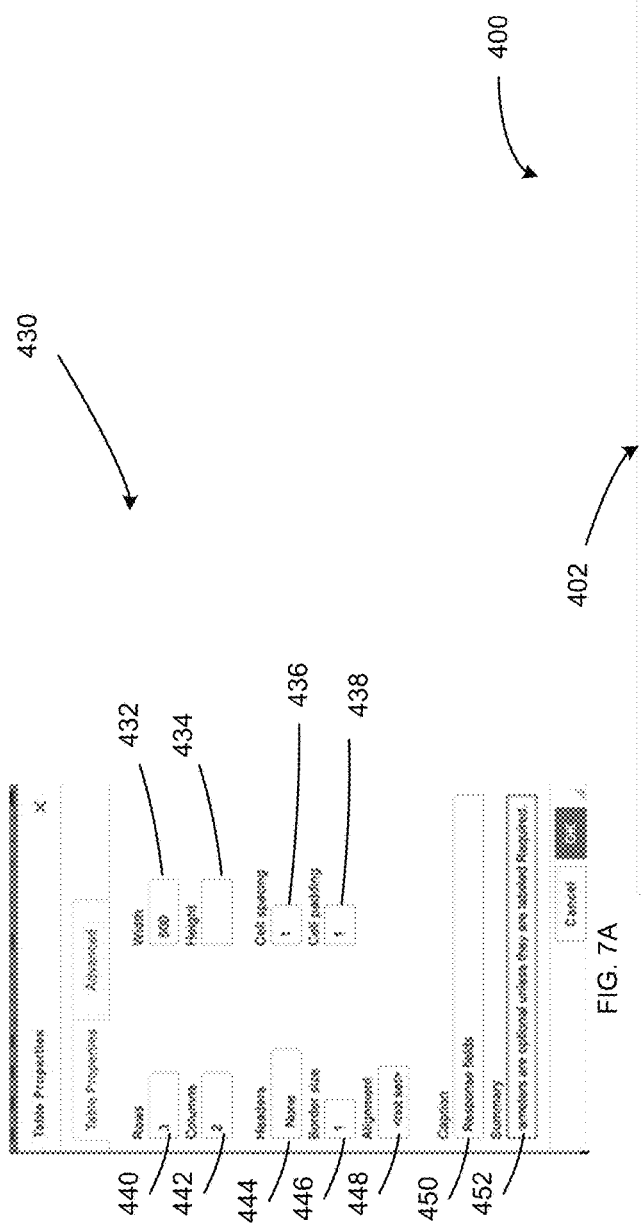
FIG. 7A is an illustration of some aspects of an API documentation editor user interface displaying a table editor executable, according to an example arrangement.
Figure 7B:
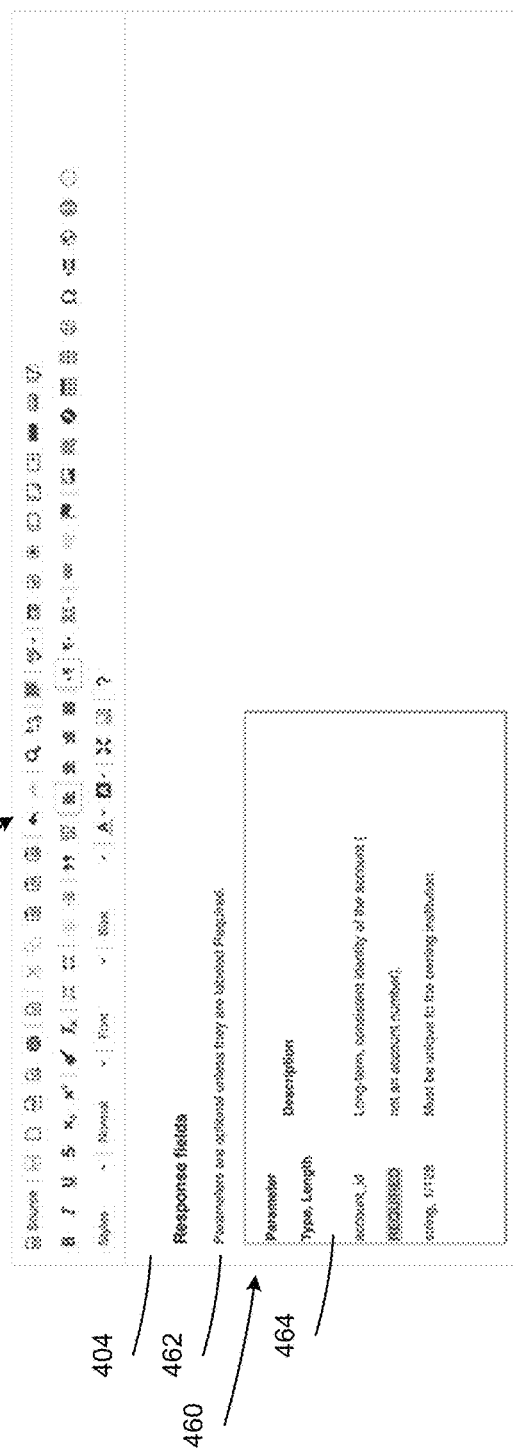
FIG. 7B is an illustration of some aspects of an API documentation editor user interface displaying an example parameter table on a parameter field of the API call field of FIG. 6B, according to an example arrangement.

In some arrangements, the interactive field 420 is structured to open, when selected additional fields (shown as parameter field 464 and a response field 462 in FIG. 7B).

FIG. 7A is an illustration of some aspects of an API documentation editor user interface 400 displaying a table editor executable interface 430, according to an example arrangement. The table editor executable interface 430 is structured to facilitate user interaction with the table editor executable 126. In some arrangements, when the table editor executable 126 is selected by a user (e.g., via the user interface 400), the table editor executable interface 430 may be displayed on the user interface 400 by the document editor computing system 110 utilizing the editor application 134. In some arrangements, and as shown in FIG. 7A, the table editor executable interface 430 includes fields structured to receive a user input. The fields include a table row field 440, a table column field 422, a table header field 444, a table boarder size field 446, a table alignment field 448, a table caption field 450, a table summary field 452, a cell width field 432, a cell height field 434, a cell spacing field 436, and a cell padding field 438.

In some arrangements, the fields are selectively automatically populated by the table editor executable 126 based a control document template. In some arrangements, when one or more of the fields is not automatically populated, the table editor executable 126 may include a prompt for a user to input alphanumeric values into each unpopulated field.

The table editor executable 126 is structured to generate an API parameter table based on the alphanumeric values each of the fields one or more table parameters including table rows, table columns, table headers, table boarder size, table alignment, table caption, table summary, cell spacing, cell padding, cell widths, and cell heights.

In some arrangements, the table editor executable 126 is structured to receive a configuration file. The table editor executable 126 may be structured to automatically determine one or more table parameters based on the configuration file. For example, the table editor executable 126 may determine a number of rows and columns for the parameter table based on the configuration file. In some arrangements, the table editor executable 126 is structured to parse one or more parameters and a description for each parameter from the configuration file. In some arrangements, the table editor executable 126 may automatically populate one or more of the cells of the parameter table with the one or more of the parameters and the description associated with the parameters.

FIG. 7B is an illustration of some aspects of an API documentation editor user interface 400 displaying an example parameter table 460 on a parameter field 464 of the API call field 410 of FIG. 6B, according to an example arrangement. As shown the parameter table includes a response field 562 and a parameter field 464. In some arrangements, the parameter table 460 may be positioned on the parameter field 464. In some arrangements, and as shown in FIG. 7B, the table editor executable 126 may be structured to automatically populate the response field to include a caption retrieved from the caption field 450 and a summary retrieved from the summary field 452. In some arrangements, table editor executable 126 is structured automatically populate the parameter table 464 with parameters and descriptions based on a configuration file.

FIG. 8 is a component diagram of an example computing system 500 suitable for use in the various arrangements described herein. For example, the computing system 500 may implement an example document editor computing system 110, a source control computing system 140, an API manager computing system 150, a developer portal 160, a CMS 170, and/or various other example systems and devices described in the present disclosure.

The computing system 500 includes a bus 502 or other communication component for communicating information and a processor 504 coupled to the bus 502 for processing information. The computing system 500 also includes main memory 506, such as a random access memory (RAM) or other dynamic storage device, coupled to the bus 502 for storing information, and instructions to be executed by the processor 504. Main memory 506 can also be used for storing position information, temporary variables, or other intermediate information during execution of instructions by the processor 504. The computing system 500 may further include a read only memory (ROM) 508 or other static storage device coupled to the bus 402 for storing static information and instructions for the processor 504. A storage device 510, such as a solid state device, magnetic disk or optical disk, is coupled to the bus 502 for persistently storing information and instructions.

The computing system 500 may be coupled via the bus 502 to a display 514, such as a liquid crystal display, or active matrix display, for displaying information to a user. An input device 512, such as a keyboard including alphanumeric and other keys, may be coupled to the bus 502 for communicating information, and command selections to the processor 504. In another arrangement, the input device 512 has a touch screen display. The input device 512 can include any type of biometric sensor, a cursor control, such as a mouse, a trackball, or cursor direction keys, for communicating direction information and command selections to the processor 504 and for controlling cursor movement on the display 514.

In some arrangements, the computing system 500 may include a communications adapter 516, such as a networking adapter. Communications adapter 516 may be coupled to bus 502 and may be configured to enable communications with a computing or communications network 105 and/or other computing systems. In various illustrative arrangements, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like According to various arrangements, the processes that effectuate illustrative arrangements that are described herein can be achieved by the computing system 500 in response to the processor 504 executing an arrangement of instructions contained in main memory 506. Such instructions can be read into main memory 506 from another computer-readable medium, such as the storage device 510. Execution of the arrangement of instructions contained in main memory 506 causes the computing system 500 to perform the illustrative processes described herein. One or more processors in a multi-processing arrangement may also be employed to execute the instructions contained in main memory 506. In alternative arrangements, hard-wired circuitry may be used in place of or in combination with software instructions to implement illustrative arrangements. Thus, arrangements are not limited to any specific combination of hardware circuitry and software.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. An application programming interface (API) definition automation system structured to programmatically generate API documentation in human-readable format, the system comprising:
   a processing circuit including a processor and memory;
   a network;
   a control database structured to retrievably store control documents and communicatively coupled to the network;
   a content database structured to retrievably store control document templates and communicatively coupled to the network;
   a configuration file manager circuit communicatively coupled to the network, and structured to generate a API configuration file in a data serialization language, wherein the API configuration file is machine-readable;
   an editor circuit communicatively coupled to the network, the editor circuit structured to:
      receive the API configuration file;
      receive a first control document, the first control document being human-readable and including the control documents and the control document templates;
      generate a user interface, the user interface comprising:
         an API call executable structured to automatically generate, based on the API configuration file, an API call field and automatically provide the API call field on the first control document; and
         a table editor executable structured to automatically generate, based on the API configuration file, a parameter table and automatically provide the parameter table on a parameter field of the API call field the API call field having a header and an interactive field that, when selected, opens a parameter field for parameters, and a response field for a caption and summary;
      receive a user input fora modification to the first control document via the user interface;
      apply the modification to the first control document based on the user input; and
   a content management hardware system structured to:
      receive the first control document from the editor circuit; and
      generate an output document based on the control documents and the modification, the output document having a HyperText Markup Language (HTML) format.

2. The system of claim 1, wherein the API call field comprises at least one of an API call title, an API method name, an API uniform resource locator (URL), and an aria label; and wherein the API call executable is structured to output the API call field comprising the header including the API call title, the API method name, the API URL, the aria label, and the interactive field that, when selected, opens the parameter field and the response field.

3. The system of claim 2, wherein the table editor executable is further structured to:
  automatically convert the received API configuration file into the parameter table;
  automatically output the parameter table on the parameter field; and wherein the parameter table comprises a parameter type and a parameter description.

4. The system of claim 2, wherein the table editor executable is further structured to:
  receive table properties including at least some of table rows, table columns, table headers, table boarder size, table alignment, table caption, table summary, cell spacing, cell padding, cell widths, and cell heights;
  generate the parameter table based on the table properties, the parameter table structured to be editable by a user;
  programmatically link the parameter table to the parameter field;
  generate a response table based on the table properties, the response table structured to be editable by the user; and
  programmatically link the response table to the response field.

5. The system of claim 2, wherein the user input is received by a document editing executable, the document editing executable comprising at least one of:
  a font editing executable structured to selectively modify a font of text on the user interface;
  a formatting editing executable structured to selectively modify a format of the text; and
  a image editing executable structured to selectively modify an image on the user interface.

6. The system of claim 2, wherein each of the control documents comprises at least one of a code snippet, a release note, and public documentation.

7. The system of claim 6, wherein the editor circuit is further structured to:
  retrieve the code snippet from a data storage media of a source control computing system; and
  provide the code snippet on at least one of the parameter field and the response field.

8. The system of claim 1, wherein the content management hardware system is further structured to publish the output document on a public facing server.

9. The system of claim 1, wherein the editor circuit is further structured to receive the user input from at least one of a plurality of computing devices, each of the plurality of computing devices communicatively coupled to the network.

10. The system of claim 9, wherein each of the computing devices comprises:
  a display structured to display the user interface; and
  an input device structured to receive the user input.

11. A method of programmatically generating an application programming interface (API) document in human-readable format, the method comprising:
  generating, by a configuration file manager circuit, an API configuration file in a data serialization language, the API configuration file is machine-readable;
  receiving, by an editing circuit, the API configuration file and a control document, the control document being human-readable;
  generating, by the editing circuit, a graphical user interface (GUI), the GUI including the control document;
  automatically generating, by an API call executable of the GUI and based on the API configuration file, an API call field having a header box, a parameter box for parameters, and a response box for a caption and summary;
  automatically positioning, by the editing circuit, the API call field on the control document;
  automatically generating, by a table editor executable of the GUI and based on the API configuration file, a parameter table;
  automatically positioning, by the editing circuit, the parameter table on the parameter box;
  receiving, by the editing circuit, a user input including a modification to the control document;
  applying, by the editing circuit, the modification to the control document;
  receiving, by a content management system, the control document from the editing circuit; and
  generating, by the content management system, an output document based on the control document and the modification, the output document having a HyperText Markup Language (HTML) format.

12. The method of claim 11, wherein the method further comprises:
  receiving, by the API call executable, at least one of an API call title, an API method name, an API uniform resource locator (URL), and an aria label;
  generating, by the API call executable, at least one of a header field, the header field comprising at least one of the API call title, the API method name, the API URL, the aria label, and an interactive field that, when selected, opens a parameter field and a response field; and
  providing, by the editing circuit, the header field on the header box.

13. The method of claim 12, wherein the method further comprises:
  receiving, by the table editor executable, at least part of the API configuration file;
  automatically converting, by the table editor executable, the received part of the API configuration file into a parameter dataset, the parameter dataset having a parameter type and a parameter description; and
  programmatically linking, by the table editor executable, the parameter dataset on the parameter table.

14. The method of claim 11, wherein generating the parameter table comprises:
  receiving, by the editing circuit, a parameter table template;
  receiving, by the table editor executable, table properties including at least one of table rows, table columns, table headers, table boarder size, table alignment, table caption, table summary, cell spacing, cell padding, cell widths, and cell heights;
  modifying, by the table editor executable, the parameter table template based on the table properties;
  generating, by the table editor executable, the parameter table based on the parameter table template; and
  programmatically linking, by the editing circuit, the parameter table to the parameter box.

15. The method of claim 11, wherein the method further comprises:
  receiving, by the editing circuit, a response table template;
  receiving, by the table editor executable, table properties including at least one of table rows, table columns, table headers, table boarder size, table alignment, table caption, table summary, cell spacing, cell padding, cell widths, and cell heights;
  modifying, by the table editor executable, the response table template based on the table properties;
  generating, by the table editor executable, a response table based on the response table template; and programmatically linking, by the editing circuit, the response table to the response box.

16. The method of claim 11, wherein the method further comprises receiving, by the editing circuit, the user input from at least one of a plurality of computing devices, each of the plurality of computing devices communicatively coupled to the editing circuit and comprising a display structured to display the graphical user interface and an input device structured to receive the user input.

17. The method of claim 11, wherein the method further comprises:
    modifying, by the content management system, the output document; and
    publishing, by the content management system, the modified output document.

18. A non-transitory computer readable medium having computer-executable instructions embodied therein that, when executed by at least one processor of a computing system, cause the computing system to perform operations to programmatically generate an application programming interface (API) documentation in human-readable format, the operations comprising:
    receiving an API configuration file, the API configuration file in a data serialization language and a machine-readable format;
    receiving a control document, the control document being human-readable;
    generating a graphical user interface (GUI), the GUI including the control document;
    automatically generating, by an API call executable of the GUI, based on the API configuration file, an API call field having a header and an interactive field that, when selected, opens a parameter field for parameters, and a response field for a caption and summary;
    automatically modifying the control document with the API call field;
    automatically generating, by a table editor of the GUI, a parameter table based on the API configuration file;
    automatically modifying the parameter field with the parameter table;
    receiving a user input for a modification to the control document via the GUI;
    modifying the control document based on the user input; and
    generating based on the modified control document an output document having a HyperText Markup Language (HTML) format.

19. The media of claim 18, wherein the operations further comprise:
    receiving header modifications, the header modifications comprising an API call title, an API method name, an API uniform resource locator (URL), and an aria label;
    modifying the header with the header modifications;
    automatically converting at least part of the API configuration file into a parameter dataset, the parameter dataset including at least one of a parameter type and a parameter description; and
    modifying the parameter table with the parameter dataset.

20. The media of claim 18, wherein the operations further comprise:
    receiving the user input from at least one of a plurality of computing devices, each of the plurality of computing devices communicatively coupled to the computing system and comprising a display structured to display the graphical user interface and an input device structured to receive the user input;
    providing the output document to a content management system;
    modifying the output document; and
    publishing the modified output document.

\* \* \* \* \*